United States Patent [19]
Orme

[11] Patent Number: 5,803,484
[45] Date of Patent: *Sep. 8, 1998

[54] EXTRUDED CLIP FOR ATTACHING AIRBAG WIRE HARNESS TO EXTRUDED MODULE REACTION CAN

[75] Inventor: Bradley L. Orme, Knoxville, Tenn.

[73] Assignee: Autoliv ASP, Inc., Ogden, Utah

[*] Notice: The term of this patent shall not extend beyond the expiration date of Pat. No. 5,664,800.

[21] Appl. No.: 676,755

[22] Filed: Jul. 8, 1996

[51] Int. Cl.$^6$ .................................................. B60R 21/16
[52] U.S. Cl. ...................... 280/728.2; 24/546; 280/728.1
[58] Field of Search ............................ 280/728.1, 728.2, 280/732, 70; 24/455, 546, 545, 547

[56] References Cited

U.S. PATENT DOCUMENTS

| | | | |
|---|---|---|---|
| 884,256 | 4/1908 | Addie | 24/546 |
| 1,516,781 | 11/1924 | Nylen | 24/546 |
| 3,305,904 | 2/1967 | Duarte | 24/545 |
| 4,617,775 | 10/1986 | Padrun | 24/545 |
| 4,915,410 | 4/1990 | Bachelder | 280/732 |
| 5,234,227 | 8/1993 | Webber | 280/728 |
| 5,342,082 | 8/1994 | Kriska et al. | 280/728 A |
| 5,344,182 | 9/1994 | Lauritzen et al. | 280/728 A |
| 5,351,371 | 10/1994 | DeVeau, Jr. et al. | 24/561 |
| 5,454,588 | 10/1995 | Rose | 280/728 |
| 5,664,800 | 9/1997 | Lux et al. | 280/732 |

*Primary Examiner*—Eric D. Culbreth

[57] ABSTRACT

An attachment system for retaining an accessory on an extruded module reaction can of a vehicle safety restraint system. At least one channel is formed integrally with the reaction can during extrusion thereof. An extruded attachment clip includes a pair of resilient legs and a rounded body part joining the legs together. The body portion of the attachment clip forms a cavity capable of receiving the accessory. The legs of the attachment clip are attachable to the channel of the reaction can to secure the accessory thereon. The extruded clip design of the present invention thus snaps onto a channel extruded into the reaction can, eliminating the need for expensive secondary manufacturing operations and assembly procedures.

10 Claims, 3 Drawing Sheets

EXTRUDED CLIP FOR ATTACHING AIRBAG WIRE HARNESS TO EXTRUDED MODULE REACTION CAN

This application is related to copending application Ser. No. 08/498,100, entitled "Retention System for Attachment of a Connector to an Airbag Reaction Canister", assigned to the assignee of the present invention.

BACKGROUND OF THE INVENTION

1. Field of the Invention

The present invention relates to an extruded attachment clip which retains an airbag wire harness on a module reaction canister during shipping and assembly of the airbag module, and more particularly, to a clip which attaches to a channel on an extruded module reaction can.

2. Description of the Related Art

It is known in the prior art to employ an inflatable vehicle safety restraint system for protecting a passenger of an automobile. Such restraint systems encompass a reaction canister which houses a gas generator or inflator, and an air bag in an uninflated condition. For actuating the gas generator or inflator, an inflator initiator or squib, which comprises an electro-explosive device, starts the material of the gas generator burning. The inflator initiator is connected to a collision sensor that is positioned adjacent the initiator or at a remote location in the vehicle.

The initiator or squib is electrically interconnected to the main wiring assembly of the vehicle via a module connector, the wiring and connector of the airbag being referred to as the airbag wire harness assembly. Normally, the airbag harness assembly is held in place on the reaction canister.

Current practice used to restrain the wire harness requires holes drilled or punched in the reaction canister into which are fastened both a rivet mount fastener and a wire tie. One disadvantage with drilling or punching holes in the reaction can is the fabrication and assembly costs associated with such secondary operations.

Another disadvantage of drilling or punching holes in the reaction can is that the can may split during bonfire testing due to the weakened areas.

SUMMARY OF THE INVENTION

An object of the present invention is to provide a clip for attaching an electrical accessory, such as an airbag wire harness, to an existing feature of the reaction can of an inflatable restraint system, which eliminates the need for expensive secondary operations, reducing manufacturing time and cost.

Another object of the present invention is to provide a clip, which by using an existing feature of the extruded housing, reduces the number of extra parts and eases module assembly.

In accomplishing these and other objectives of the present invention, there is provided an attachment system for retaining an accessory on an extruded module reaction can of a vehicle safety restraint system. At least one channel is formed integrally with the reaction can during extrusion thereof. An extruded attachment clip, having opposed ends, is capable of receiving the accessory at one end and the other end of the attachment clip is attachable to the channel of the reaction can to secure the accessory thereon.

The attachment clip includes a pair of resilient legs and a body portion joining the pair of legs. A cavity is formed in the body portion. During assembly, the clip is snapped onto the accessory, such that the accessory is located within the cavity. The pair of resilient legs of the clip are then fastened onto the channel of the reaction can.

Other features and advantages of the present invention will become apparent from the following description of the invention which refers to the accompanying drawings.

DETAILED DESCRIPTION OF THE PREFERRED EMBODIMENT

Figure 1:
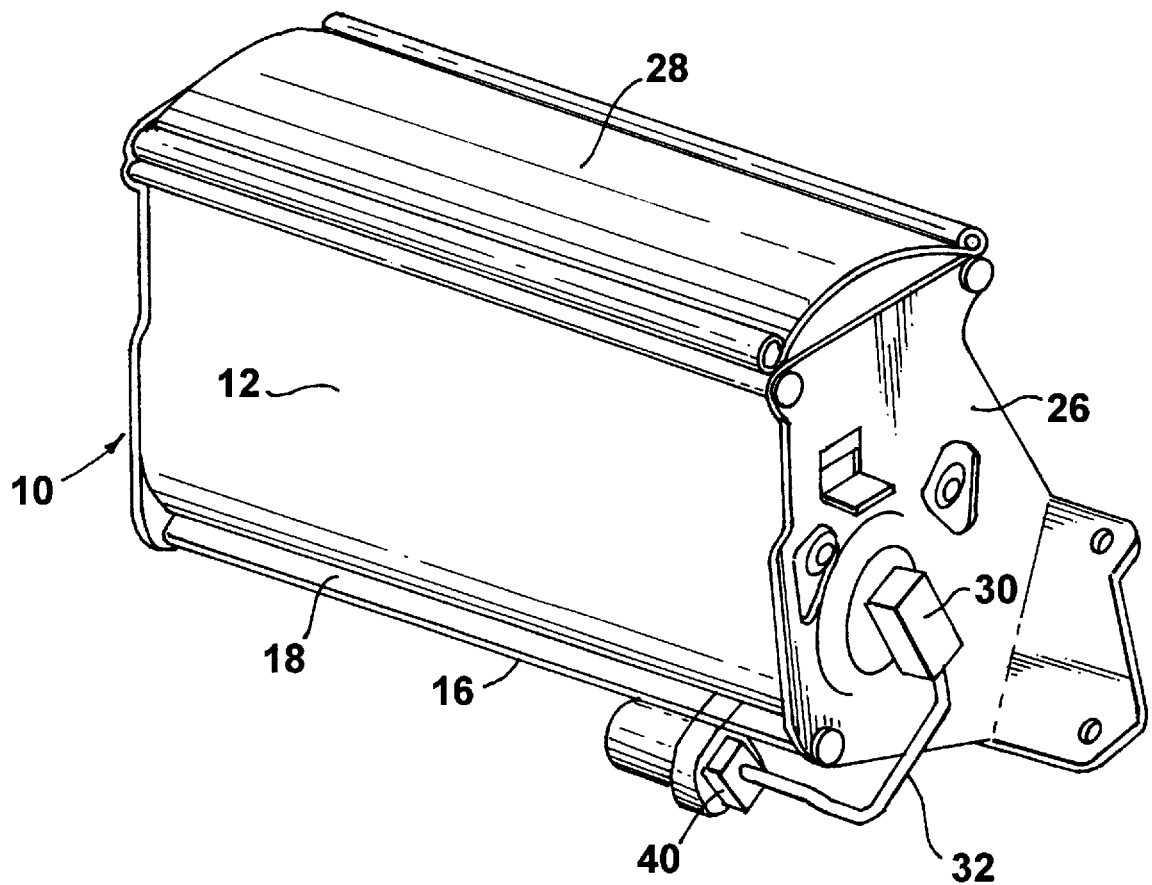
FIG. 1 is a perspective view of a reaction canister and attachment clip for securing an electrical accessory to a reaction can according to the present invention.
Figure 2:
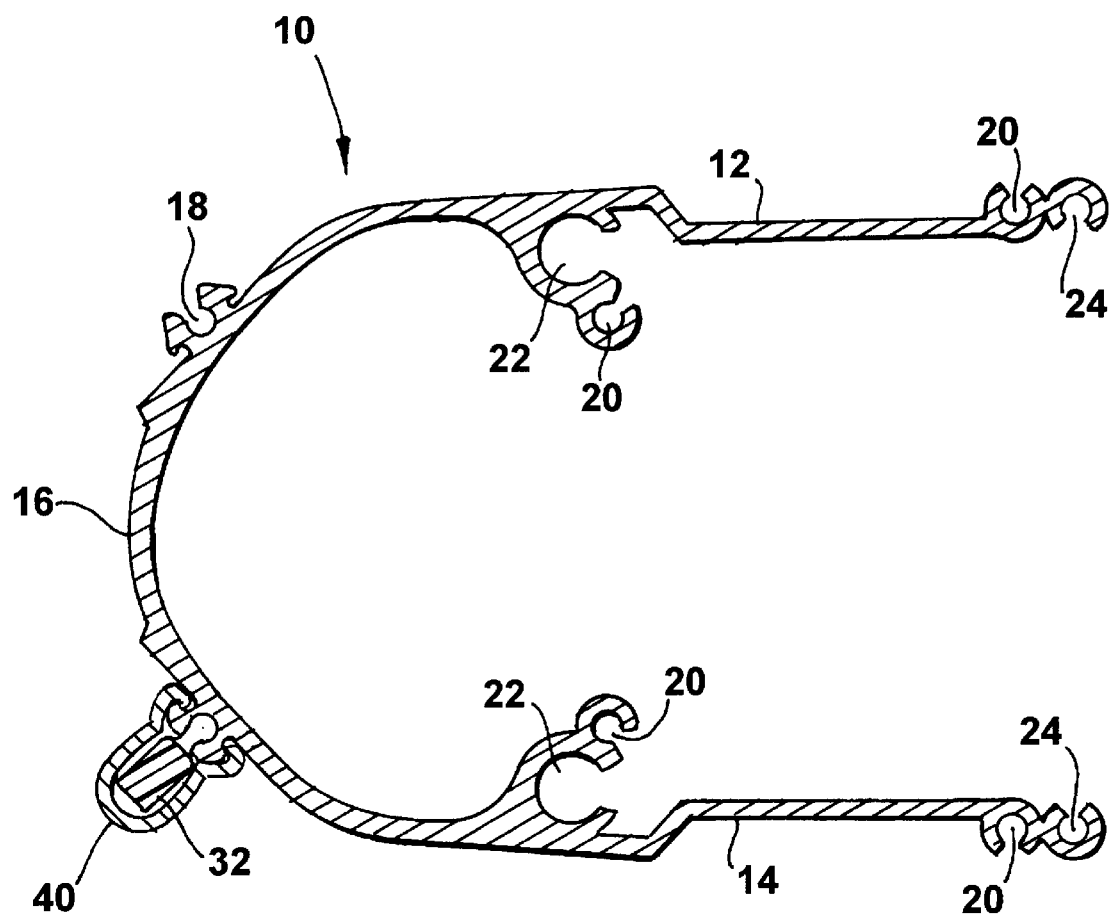
FIG. 2 is a cross-sectional view illustrating the engagement of the attachment clip on the reaction can.

Referring to FIGS. 1 and 2, a reaction canister 10 houses a gas generator and inflatable air bag (not shown) of a vehicle safety restraint system. Reaction canister 10 has a trough-shaped body including opposed sidewalls 12 and 14 and a rounded bottom wall 16 joining the sidewalls.

The body of the canister is extruded from a continuous length of material, in particular aluminum, and then cut into various lengths to accommodate a variety of generator sizes. Extrusion of the canister body allows for the integral formation of various features, such as screw retaining channels or grooves 18, 20, for attaching end plates 26.

Reaction can 10 also includes a pair of integral channels 22 and grooves 24 formed during extrusion. Channels 22 can receive and hold a portion of an inflatable air bag (not shown) or tether straps of an air bag, as is known in the prior art. Grooves 24 are provided for connecting a cover 28 on the reaction can, as shown in FIG. 1. Depending on the particular reaction can, different features will be formed integrally with the housing at different locations in the housing during extrusion. It should be appreciated that the present invention is not limited to use with a particular reaction can design.

The reaction canister 10 is extruded with, for example, screw retaining channel 18, as shown in FIG. 2, extending along the entire length of the canister body. During assembly of the restraint system, the air bag and gas generator are loaded in the canister, and the end plates are secured to the canister by fasteners. At least one of the end plates 26 is configured to allow an inflator initiator or squib 30 to extend therethrough (see FIG. 1). Inflator initiator 30 communicates with the inflator housed within canister 10.

An airbag wire harness assembly 32 extends from initiator 30. Airbag wire harness assembly 32 is the device that electrically interconnects the main wiring assembly of the vehicle to the inflator assembly's associated hardware and can comprise a pair of lead wires attached to a module connector.

Figure 4:
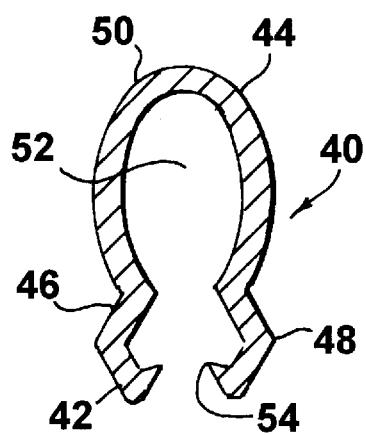
FIG. 4 is an enlarged cross-sectional view of the attachment clip of the present invention.
Figure 5:
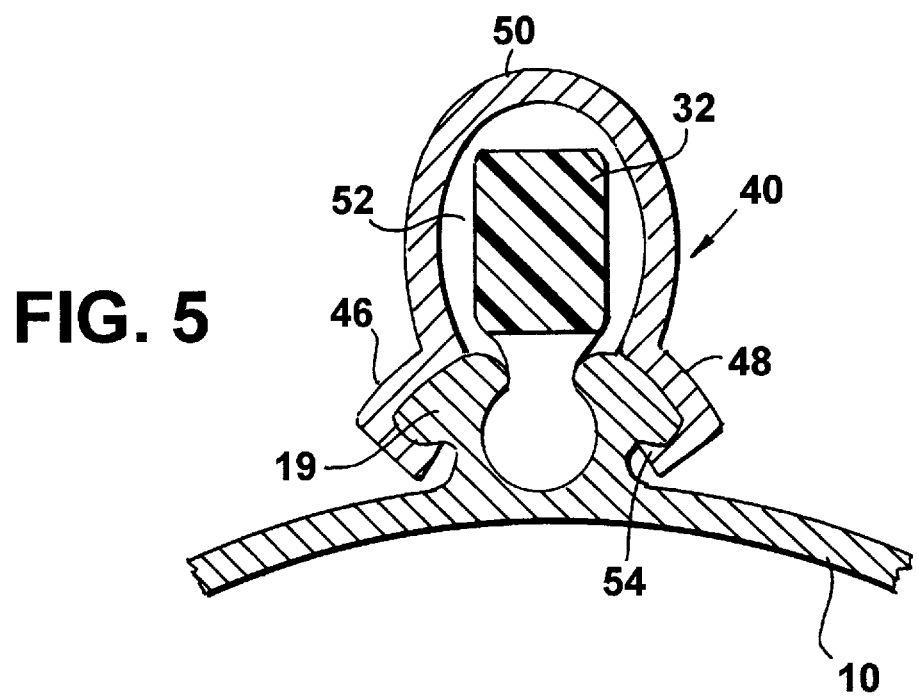
FIG. 5 is an enlarged cross-sectional view illustrating the engagement of the attachment clip on the reaction can.

Referring to FIGS. 2–5, an attachment clip 40 is provided for engaging an existing extruded feature of the reaction can 10, for example, screw retaining channel 18, at one end 42 and supporting the airbag wire harness assembly 32 at a second end 44, as shown in FIGS. 2 and 5. It should be understood that clip 40 can be used to secure the airbag harness onto other existing features of the module reaction can.

Clip 40 can be extruded from a resilient plastic material, such as nylon or polyethylene, and cut into discrete lengths, thus simplifying manufacture thereof.

Figure 3:
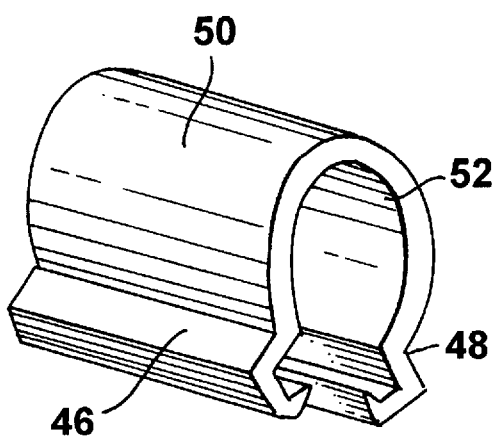
FIG. 3 is an enlarged perspective view of the attachment clip of the present invention.

As shown in FIGS. 3 and 4, attachment clip 40 includes a pair of resilient leg portions 46, 48 at end 42. A rounded body portion 50, at end 44, joins legs 46, 48 together. A cavity 52 is formed within body portion 50 for accommodating airbag wire harness assembly 32, which will be described further herein. Each of the leg portions 46, 48 can include a notch 54 for retaining the clip on, for example, channel 18, as shown in FIG. 5.

Channel 18 includes a pair of projections 19 extending outwardly from the reaction can. When assembled on reaction can 10, leg portions 46, 48 engage projections 19. Projections 19 can also be notched to aid in engagement with legs 46, 48 of the attachment clip.

Next, the assembly of the wire harness assembly and clip to the reaction canister will be described. During assembly, the inflator and air bag are secured within the body of reaction canister 10. The end plates 26 can then be secured to the canister body using the plurality of screw channels 18, 20 and fasteners. Cover 28 can then be attached to the canister body. Once the inflator assembly is complete, the clip 40 is snapped onto airbag wire harness assembly 32, such that the same is accommodated within cavity 52 of clip 40. Thereafter, clip 40 is snapped over an existing feature of the reaction can 10, such as screw retaining channel 18, as previously described.

It should be appreciated that the present invention is not limited to any particular order of assembly, as the actual assembly method depends upon the actual manufacturing assembly line and that the clip of the present invention can be used to secure other electrical accessories, such as a speedometer cable, etc., depending on a particular automaker's requirements.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An attachment system for retaining an accessory on an extruded module reaction can of a vehicle safety restraint system, comprising:

at least one channel formed integrally with the reaction can during extrusion thereof; and an extruded attachment clip having opposed ends, one end of the attachment clip being capable of receiving the accessory and the other end of the attachment clip being attachable to the channel of the reaction can to secure the accessory thereon, wherein the attachment clip includes a pair of resilient legs and a rounded body portion joining the pair of legs.

2. The attachment system of claim 1, wherein the channel includes attachment means extending outwardly from the reaction can for attaching the clip thereto.

3. The attachment system of claim 2, wherein the attachment means comprises a pair of projections, the pair of legs of the clip engaging the pair of projections of the channel when the clip is fastened on the channel.

4. The attachment system of claim 1, wherein the body portion of the attachment clip forms a cavity for receiving and retaining the accessory.

5. The attachment system of claim 1, wherein the accessory comprises an electrical airbag wire harness assembly.

6. The attachment system of claim 1, wherein the attachment clip is extruded from a resilient plastic material.

7. A method of attaching an accessory to an extruded module reaction can of a vehicle safety restraint system, the reaction can including a channel formed integrally therewith during extrusion, comprising the steps of:

providing an attachment clip, the attachment clip including a first and second end;

locating the accessory within the first end of the attachment clip; and attaching the second end of the clip to the channel of the reaction can.

8. The method of claim 7, wherein the clip includes a pair of resilient legs joined together by a body portion, and the channel includes attachment means extending outwardly from the reaction can, the step of attaching the clip to the channel comprising attaching the legs of the clip to the attachment means of the channel.

9. The method of claim 8, wherein the attachment means comprises a pair of projections extending outwardly from the channel, the step of attaching the clip to the channel further comprising fastening the pair of legs of the clip with the pair of projections of the channel.

10. The method of claim 8, wherein the body portion of the clip forms a cavity and the step of locating the accessory within the clip comprises snapping the clip onto the accessory, such that the accessory is located within the cavity.

\* \* \* \* \*